United States Patent [19]

Chameroy et al.

[11] Patent Number: 4,564,863
[45] Date of Patent: Jan. 14, 1986

[54] METHOD AND DEVICE FOR ADJUSTING THE BLACK LEVEL OF A VIDEO SIGNAL

[75] Inventors: Pascal Chameroy, Puteaux; Alain Decraemer, Garches, both of France

[73] Assignee: U.S. Philips Corporation, New York, N.Y.

[21] Appl. No.: 562,339

[22] Filed: Dec. 16, 1983

[30] Foreign Application Priority Data

Dec. 22, 1982 [FR] France ............... 82 21565

[51] Int. Cl.$^4$ ............... H04N 5/18; H03L 5/00; H03B 1/04; H03B 19/00
[52] U.S. Cl. ............... 358/172; 307/264; 307/549; 307/555
[58] Field of Search ............... 358/172; 307/264, 549, 307/552, 555, 540; 328/139

[56] References Cited

U.S. PATENT DOCUMENTS 3,811,053 5/1974 Habib ............... 307/264
4,178,558 12/1979 Nagashima et al. ............... 358/172

Primary Examiner—Michael A. Masinick
Assistant Examiner—E. Anne Toth
Attorney, Agent, or Firm—Thomas A. Briody; William J. Streeter; Edward W. Goodman

[57] ABSTRACT

Method and device by which, at a given instant, a conductor (4) at the output of a capacitor (5) carrying a video signal is connected to a reference voltage source (1, 2). The use of a voltage source (1, 2) whose impedance depends on the direction of the current which it supplies, makes it possible to connect the conductor (4) to the voltage source (1, 2) during the whole duration of a line flyback, instead of being obliged to use a special pulse occurring solely at the end of the line flyback time. In the case of positive white, for example, a positive current supply part of the voltage source (2) having a high impedance sends a positive supply current to the conductor (4) carrying the video signal, and a low-impedance negative current supply part (1) connects this conductor to ground.

4 Claims, 3 Drawing Figures

METHOD AND DEVICE FOR ADJUSTING THE BLACK LEVEL OF A VIDEO SIGNAL

BACKGROUND OF THE INVENTION

The invention relates to a method for adjusting the black level of a video signal, in particular for television, which signal is transferred by a capacitor, whereby a conductor which conducts this signal is connected to a voltage source for a fraction of the duration of a picture scanning line.

It relates equally to a device for adjusting the black level of a video signal, in particular in a picture receiver.

Circuits capable of delivering the video signals with a continuous level of polarity deviating little with temperature, constant in time and relatively insensitive to supply voltage variations are expensive and complex. It has therefore long been the practice to transmit the video signal without its continuous polarity and to restore it subsequently. A circuit for restoring this polarity, that is to say for "adjusting the black level", is known from the work "guide de la télévision en couleurs" (Guide to color television) published by CHIRON (PARIS), page 120 and in particular figure IV.10.

This circuit is provided with a voltage source constituted by a set of diodes, some of which deliver a current in one direction and others which deliver a current in the other direction. This set of diodes is controllable by signals applied to certain of the diodes, and is linked with a connection which conducts the video signal.

This set of diodes constitutes a switch for linking the connection to a voltage source, namely ground, for a fraction of the duration of a picture scanning line.

Unfortunately the signal voltage level, the "pedestal", during the line retrace or flyback, is interrupted by a synchronization pulse whose level is different from that of the pedestal and which upsets the adjustment of the black level, that is to say of the pedestal. For this reason, control of the diodes has to take place solely during a strictly defined period of time and outside the synchronization pulse. To this end, the work cited prescribes the use of a color reference signal situated after the synchronization pulse. Unfortunately, no such signal exists in monochrome television sets. In this case it is necessary to generate an appropriate signal, for example by logically combining a line flyback (blanking signal) and the synchronization pulse. This necessitates the use of specific circuits and, in particular, of additional connections for taking off the signals ad hoc at different points in the receiver.

SUMMARY OF THE INVENTION

The object of a invention is to provide the means for adjusting the black level without clipping the synchronization pulse while using, as the control signal, only the line flyback (blanking) signal, which is available in all picture receivers.

The invention is based on the idea of introducing a different time constant depending on whether the video signal is too high or too low relative to its ideal level, and to produce this time constant by means of a linking video signal capacitor associated with the internal impedance of the voltage source.

A method in accordance with the invention is thus noteworthy in particular in that said conductor is connected to said voltage source during the entire duration of a line flyback, and the internal impedance of the voltage source used varies depending on the direction of the current it delivers.

A device in accordance with the invention, provided with a variable voltage source connected with a conductor which conducts the signal, the voltage source being constituted by a first part which delivers a current in one direction and a second part which delivers a current in a second direction, is noteworthy in particular in that one of the two parts has a weak internal impedance while the other part has a significantly higher internal impedance, and in that a common control circuit activates the two parts simultaneously during the entire duration of a line flyback.

In an advantageous variant, a device in accordance with the invention, situated in a picture receiver comprising a sweep control circuit capable of delivering at a terminal a line flyback (blanking) signal, a device provided with a switch for linking a conductor, which conducts the video signal, to a voltage source, is likewise noteworthy in that the voltage source comprises a low-impedance part capable of continuously delivering current in a single polarity, and a part having a significantly higher impedance capable of continuously delivering current in a second polarity, and in that a control connection of the switch is connected to the terminal of the sweep (scanning) control circuit.

DESCRIPTION OF THE DRAWING

The description that follows, giving non-limiting examples in regard to the appended drawing, aims at elucidating how the invention can be implemented.

DESCRIPTION OF THE PREFERRED EMBODIMENTS

The description that follows relates to a video frequency signal with positive modulation, that is to say whose maximum voltage represents the peak white level, and where the synchronization pulses are negative relative to the black level (pedestal). It is obvious that the circuit can easily be adapted to negative modulation by changing the polarity or direction of the components, without departing from the framework of the invention.

Figure 1:
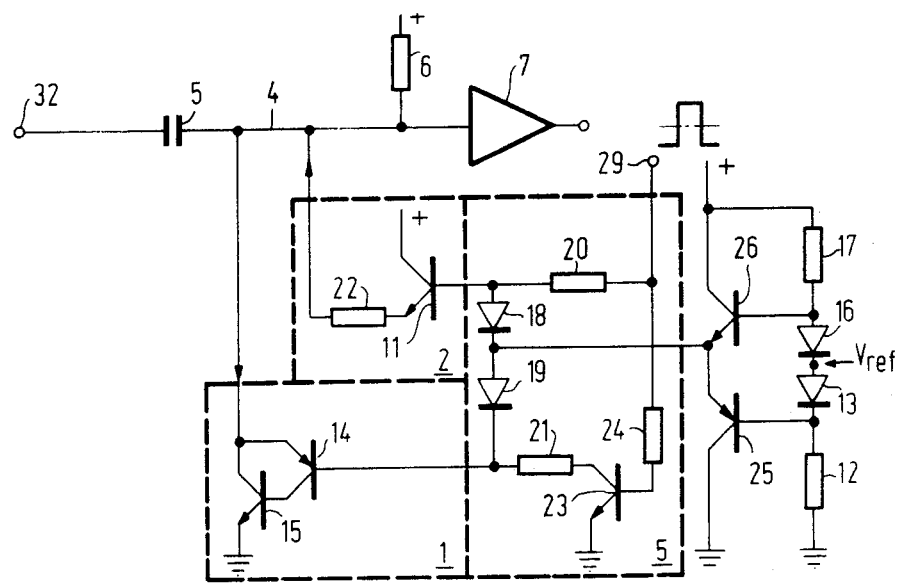
FIGS. 1 and 2 show diagrams of two examples of devices in accordance with the invention.

FIG. 1 illustrates a circuit permitting implementation of the method of the invention. The video signal (shown in FIG. 3) is fed to a terminal 32, and is transferred to a conductor 4 and to an amplifier 7 by a coupling capacitor 5. The conductor 4 conducting the video signal is connected to a reference voltage source for a fraction of the duration of a picture scanning line. This reference voltage source is constituted here by a point midway between two diodes 13 and 16. This voltage is determined by a dividing bridge constituted between the positive supply and ground by a resistor 17, the diodes 16 and 13 and a resistor 12 in series. A pair of transistors 25 and 26, mounted in complementary push-pull, enable the reference voltage to be supplied to the common point of the emitters of the transistors 25 and 26 and a significant current to be delivered in either polarity. The conductor 4 can be connected to the reference voltage via the emitter-base of a cascade transistor pair 14, 15, a diode 19, via the emitter-base of transistor 26 and the diode 16. In this series of components there are two diodes in one direction and two diodes in the opposite direction, whose voltage drops approximately compensate each other, thereby providing the reference voltage on conductor 4. In the same manner this conductor 4 can be connected also to the reference voltage via a resistor 22, the emitter-base of a transistor 11, a diode 18, the emitter-base of the transistor 25 and the diode 13. By virtue of the resistor 22, a current is supplied by the transistor 11 to the conductor 4 under a higher impedance than that supplied by the transistors 14, 15 in the other direction.

The voltage source broadly constituted by the set of components 11 to 14, 16 to 19, 22, 25 and 26 thus has an internal impedance which varies depending on the direction of the current it supplies. This source is not active until a line flyback pulse is applied to a terminal 29, which pulse makes the transistors 11 and 23 conductive, thereby connecting the conductor 4 to the reference voltage source $V_{ref}$ during the entire duration of a line flyback.

The set of components 11 to 26 constitutes a controllable voltage source connected to the conductor 4 which carries the video signal. This voltage source comprises a first part 1, formed by the transistors 14 and 15 in a cascade transistor configuration with complementary transistors, equivalent to a PNP transistor and delivering a current in a first direction, going from the conductor 4 to ground, and a second part 2 formed by the resistor 22 in series with the emitter of the NPN transistor 11 whose collector is connected to the positive supply, which second part supplies a current in the other direction, going from the positive supply to the conductor 4. The part 1 has a low internal impedance, due notably to the cascade transistor configuration which increases the current capable of being conducted to ground. The part 2 has a significantly higher internal impedance by virtue of the resistor 22 inserted in series in the circuit. The set of components 18 to 21, 23, 24 constitutes a control circuit 5, common to the parts 1 and 2, and which activates them simultaneously during the entire duration of a line flyback. The terminal 29 is connected via a resistor 24 to the base of a transistor 23 whose emitter is connected to ground. The collector of the transistor 23 is connected via a resistor 21 to the base of the cascade transistor configuration 14, 15 and to the cathode of the diode 19. The terminal 29 is thus connected to the base of the transistor 11 and to the anode of a diode 18, via a resistor 20. The cathode of the diode 18 is connected to the anode of the diode 19 and to the common point of the emitters of the transistors 25, 26 which constitute a reference voltage source of low impedance.

The voltage applied to the terminal 29 is zero volts during the forward sweep of a scanning line and 4 to 5 volts during the entire duration of the line retrace (flyback). While the terminal 29 is at zero volts, the transistor 23 is blocked, no current passes through the resistor 21, and the diode 19 in opposition with the base junction of the transistor 14 blocks the latter. As will be shown later, the voltage on the conductor 4 develops between 2 and 5.5 volts, so that the transistor 11 is likewise blocked when its base is at zero volts. The transistors 14, 15 and 11 all being blocked, the voltage on the conductor 4 can develop freely. During the entire line flyback, the voltage on the terminal 29 goes to 5 volts. The transistor 23 is then conductive and draws a current from the emitter of the transistor 26 via the diode 19 and the resistor 21. The potential of the cathode of the diode 19 is likewise at the reference voltage less the voltage drop across the diode. The transistor 23 also draws current on the base of the cascade transistor configuration 14, 15 which is thus conductive. Its emitter voltage is at most equal to the voltage on the cathode of the diode 19 plus the base-emitter voltage, giving finally approximately the reference voltage. The transistor 11 is also conductive, its base being connected to the potential of 5 volts by the resistor 20. But its base voltage is equal to the reference voltage plus the voltage on the terminals of the diode 18. Its emitter voltage is thus at least equal to the anode voltage of the diode 18 less its own base-emitter voltage, here too giving finally, approximately, the reference voltage.

Figure 3:
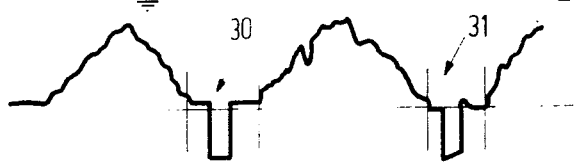
FIG. 3 shows the waveform of a video signal.

The video signal applied to the conductor 4 is shown in FIG. 3. It has a peak-to-peak amplitude of about 3.5 volts, which means there is about 1 volt for the synchronization pulse and 2.5 volts for the video signal proper. The conductor 4 in FIG. 1 is connected to the positive supply by a resistor 6 of high resistance. Because of this, the average value of the signal on the conductor 4 has a tendency to increase since the capacitor 5 charges up via the resistor 6. In this way, during a line retrace 30 where it was supposed there was no action from the adjusting device, the pedestal voltage (black level) is higher than the reference voltage of 3 volts indicated by a dashed line.

Thus the mean value of the total signal increases and after some time it will reach practically the value of the positive supply voltage. During the line flyback 31, where the device in accordance with the invention has been put into operation, at the beginning of the line flyback where the voltage is too high the latter voltage is brought rapidly to the reference voltage by the transistors 14, 15 whose emitter voltage, as has been explained above, is at most about equal to the reference voltage. Upon the appearance of the synchronization pulse, the voltage drops below the reference voltage. The emitter of the transistor 11 has a voltage equal at least to the reference voltage, but the resistor 22 limits the current and the capacitor 5 cannot charge up quickly. The bottom of the pulse thus has only a slightly positive slope and the voltage has not risen very much when the end of the pulse arrives. This slight rise has lifted the signal value, but from the beginning of the black level which follows the pulse the voltage is, as previously, very quickly returned to the reference level by the transistors 14, 15 and one observes only a small positive peak of very short duration. The black level (pedestal) thus being adjusted to the reference voltage of 3 volts, the bottom of the pulses is at about 2 volts and the white level is at about 5.5 volts.

Figure 2:
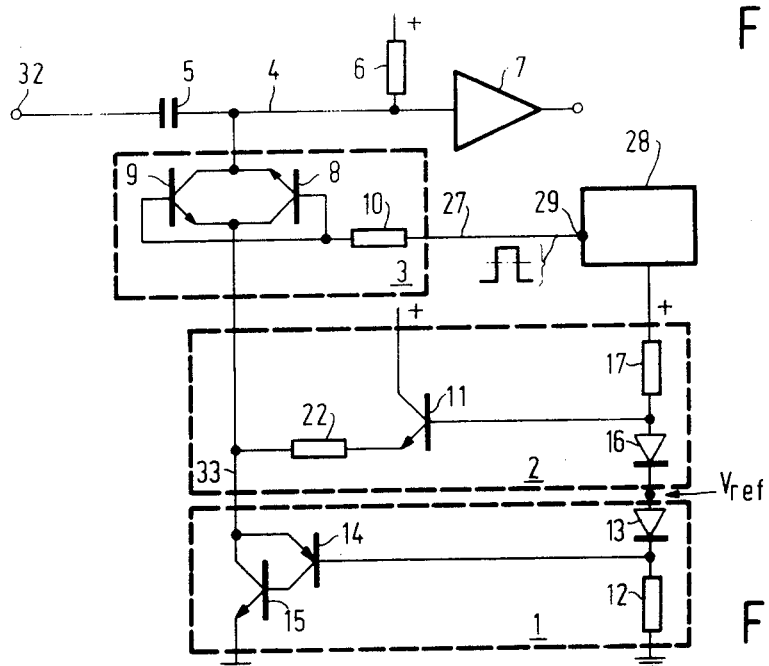

FIG. 2, in which the equivalent components are indicated by the same references as in FIG. 1, represents an advantageous variant by virtue of its simplicity. Instead of a current source controlled upon each line flyback, a source capable of supplying current continuously is used but a switch 3 is placed in series with it. The picture receiver comprises a sweep (scanning) control circuit 28 which can deliver to a terminal 29 a line flyback signal, and it is provided with the switch 3 for connecting the conductor 4, which carries the video signal, to a voltage source formed by the two reference parts 1 and 2. The part 1 is at low impedance and can deliver continuously a current going from the conductor 4 to ground.

The part 2 has a significantly higher impedance due to the series resistor 22, and can continuously deliver current going from the positive supply to the conductor 4. The diagram of the voltage sources resembles that in FIG. 1, where the blockage control components, 18, 19, 20, 21, 23, 24, 25 and 26 have been omitted. The bases of the transistors 11 and 14 are now directly connected, respectively, to the anode of the diode 16 and to the cathode of the diode 13, and the sources are able to supply current continuously. On the other hand the switch 3 is inserted between a connection 33 of a common output of the two parts 1 and 2 of the voltage source and the conductor 4. This switch 3 is formed by two transistors 8 and 9, both NPN types, the emitter of the transistor 8 and the collector of the transistor 9 being connected to the conductor 4, the emitter of the transistor 9 and the collector of the transistor 8 being linked with the connection 33. The bases of these two transistors are both linked, via a resistor 10, to a connection 27 which controls the switch, the latter being connected to the terminal 29 of the sweep control circuit 28. At this terminal 29 there appears the same line flyback signal as at terminal 29 in FIG. 1. In the forward trace of a line, the terminal 29 is reduced to zero volts, the conductor 4 is brought to a video voltage comprised between 3 and 5.5 volts and the connection 33 is maintained at 3 volts, the reference voltage. The two transistors 8 and 9 are thus blocked. During a line flyback, the terminal 29 is brought to 5 volts, the conductor 4 is brought to a pedestal or pulse voltage comprised approximately between 2 and 3 volts, and the connection 33 is still maintained at 3 volts. The two transistors 8 and 9 are thus conducting and connect the conductor 4 to the voltage source parts 1, 2 which functions as in the case of FIG. 1. The black level is slightly less exact than with the device in FIG. 1 because the potential drops due to the non-zero saturation voltage of the transistors 8, 9 are added to the reference voltage; on the other hand the circuit is simpler.

The resistor 6 might be taken to ground. In that case, however, the average voltage would show a tendency to decrease and the level before the synchronization pulse (the front porch) would be adjusted (aligned) by the part of the voltage source with a high internal impedance; this adjustment would therefore be less effective. It is thus useful that a current source, formed here by the resistor 6 connected to the positive supply, should be connected permanently to the conductor 4 in order to supply it with a current in the same direction as the high-impedance part 2 of the voltage source.

Other variants may be conceived without departing from the framework of the invention. For example, the two transistors 8 and 9 of the switch 3 may advantageously be replaced by a single field-effect transistor if available technology enables it to be integrated with the rest of the circuit.

The transistors 14, 15 may be replaced by a single PNP transistor.

The voltage source parts 1, 2 may be realized in different ways known to persons skilled in the art, provided that the part designed to adjust the base of the synchronization pulse has a higher impedance than the other.

What is claimed is:

1. Device for adjusting the black level of a video signal which is transferred by a capacitor, the device being provided with a controllable voltage source connected to a conductor at an output of the capacitor which conducts said video signal, which voltage source is formed by a first part for delivering a current in a first direction, and by a second part for delivering a current in a second direction, in which one of the two parts has a weak internal impedance while the other part has a higher internal impedance, and in which a common control circuit simultaneously activates the two parts during the entire duration of a line flyback.

2. Device for adjusting the black level of a video signal transferred by a capacitor in a picture receiver, comprising a sweep control circuit capable of delivering to a terminal a line flyback signal, wherein said device further comprises a switch, having a control input, for connecting a conductor carrying said video signal, to a voltage source, in which said voltage source comprises a part having a low impedance for continuously delivering current in a first direction, and a part having a higher impedance for delivering current continuously in a second direction, and in which said switch control input is connected to said terminal of the sweep control circuit.

3. Device as claimed in claim 1, in which a current source is permanently connected to the conductor carrying the video signal for supplying said conductor with a current in the same direction as the high-impedance part of said voltage source.

4. Device as claimed in claim 2, in which a current source is permanently connected to the conductor carrying the video signal for supplying said conductor with a current in the same direction as the high-impedance part of said voltage source.

* * * * *